(12) United States Patent
Shin

(10) Patent No.: US 12,549,844 B2
(45) Date of Patent: Feb. 10, 2026

(54) IMAGE PROCESSING APPARATUS, IMAGE PICKUP APPARATUS, AND IMAGE PROCESSING METHOD

(71) Applicant: CANON KABUSHIKI KAISHA, Tokyo (JP)

(72) Inventor: Akihito Shin, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 207 days.

(21) Appl. No.: 18/426,770

(22) Filed: Jan. 30, 2024

(65) Prior Publication Data

US 2024/0276094 A1    Aug. 15, 2024

(30) Foreign Application Priority Data

Feb. 15, 2023  (JP) ................................ 2023-022028

(51) Int. Cl.
*H04N 23/611*  (2023.01)
*G06T 7/60*  (2017.01)

(52) U.S. Cl.
CPC ............ *H04N 23/611* (2023.01); *G06T 7/60* (2013.01); *G06T 2207/30201* (2013.01)

(58) Field of Classification Search
CPC ...... H04N 23/611; H04N 23/69; H04N 23/80; H04N 23/675; H04N 23/61; H04N 23/632; H04N 23/633; H04N 23/672; H04N 23/673; H04N 23/62; H04N 23/959; G06T 7/60; G06T 2207/30201; G06T 7/62; G06T 3/40; G06T 7/80; G06T 5/73; G06V 40/161
See application file for complete search history.

(56) References Cited

U.S. PATENT DOCUMENTS

| | | | | |
|---|---|---|---|---|
| 10,440,251 B2* | 10/2019 | Ono | ................ | H04N 23/675 |
| 10,848,680 B2* | 11/2020 | Tsubusaki | ............ | H04N 23/69 |
| 11,847,778 B2* | 12/2023 | Sezer | ................ | G06T 5/92 |
| 2007/0091196 A1* | 4/2007 | Miyanohara | ........ | H04N 23/81 |
| | | | | 348/335 |
| 2016/0140748 A1* | 5/2016 | Cline | ................ | G06V 10/56 |
| | | | | 345/475 |
| 2019/0387158 A1* | 12/2019 | Ono | ................ | H04N 23/675 |
| 2023/0179869 A1* | 6/2023 | Mimura | ............ | H04N 23/71 |
| | | | | 348/362 |

FOREIGN PATENT DOCUMENTS

JP      11-353477 A     12/1999
JP      2017-041791 A   2/2017

* cited by examiner

*Primary Examiner* — Lin Ye
*Assistant Examiner* — Tuan H Le
(74) *Attorney, Agent, or Firm* — Cowan, Liebowitz & Latman, P.C.

(57) ABSTRACT

An image processing apparatus includes a memory storing instructions, and a processor configured to execute the instructions to acquire information about an object size in first image data, acquire a parameter about an optical characteristic of an optical system, acquire, based on the parameter, a characteristic that changes according to the information about the object size, and generate second image data by applying the characteristic to the first image data. The parameter changes according to at least one of states of zoom, focus, and an aperture stop of the optical system. The processor is configured to change processing according to whether it is determined that the at least one state has changed.

14 Claims, 4 Drawing Sheets

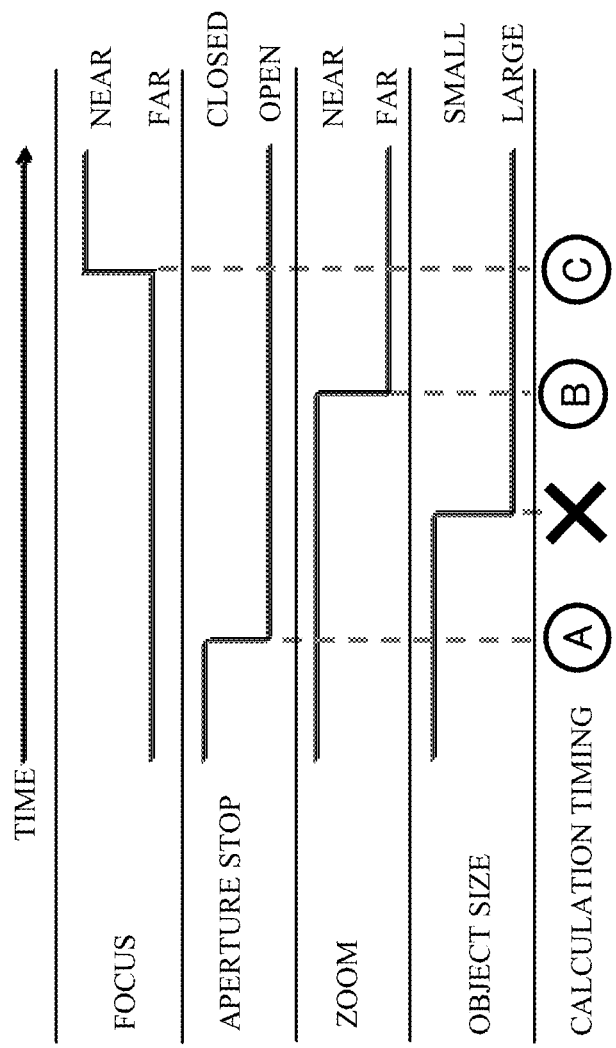

IMAGE PROCESSING APPARATUS, IMAGE PICKUP APPARATUS, AND IMAGE PROCESSING METHOD

BACKGROUND

Technical Field

One of the aspects of the embodiments relates to an image processing apparatus, an image pickup apparatus, and an image processing method.

Description of Related Art

Japanese Patent Laid-open No. 2017-41791 discloses a method of determining whether to perform image processing such as beautiful-processing skin based on whether a human face exists in an image. The method exploits a characteristic that a human face exists in an image at image pickup of a portrait and performs image processing on only an image to be provided with a beautiful-skin effect, thereby reducing influence of the image processing.

Japanese Patent Laid-open No. 11-353477 discloses an image processing method of reproducing flare by converting an original image signal into a converted image signal representing an amount corresponding to object luminance, incident light intensity, or regeneration luminance, performing smoothing processing on the converted image signal, and then inversely converting the converted image signal into an image signal.

With the method disclosed in Japanese Patent Laid-open No. 2017-41791, an adverse effect is more noticeable than an effect of beautiful-skin processing in a case where a face in an image is small, and specifically, blurring is noticeable. With the image processing method disclosed in Japanese Patent Laid-open No. 11-353477, an applied effect is too strong or too weak in some cases, depending on the size of an object. In a method, an appropriate effect is provided by applying a characteristic suitable for the size of an object an image. With this method, it is possible to obtain, for example, a suitable beautiful skin effect according to the object size.

However, for example, in a case where a characteristic is applied in accordance with the object size during image pickup, the characteristic changes if the object size changes. In a case of using an optical system with which a characteristic such as an aberration characteristic changes when the state of focus, aperture, zoom, or the like has changed, discomfort is potentially provided to a user, depending on the way of changing a characteristic applied to an image.

SUMMARY

An image processing apparatus according to one aspect of the disclosure includes a memory storing instructions, and a processor configured to execute the instructions to acquire information about an object size in first image data, acquire a parameter about an optical characteristic of an optical system, acquire, based on the parameter, a characteristic that changes according to the information about the object size, and generate second image data by applying the characteristic to the first image data. The parameter changes according to at least one of states of zoom, focus, and an aperture stop of the optical system. The processor is configured to change processing according to whether it is determined that the at least one state has changed. An image pickup apparatus having the above image processing apparatus also constitutes another aspect of the disclosure. An image processing method corresponding to the above image processing apparatus also constitutes another aspect of the disclosure.

Further features of various embodiments of the disclosure will become apparent from the following description of embodiments with reference to the attached drawings.

BRIEF DESCRIPTION OF THE DRAWINGS

FIGS. 4A and 4B are diagrams illustrating timings of applied characteristic calculation by the image pickup apparatus according to the second embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
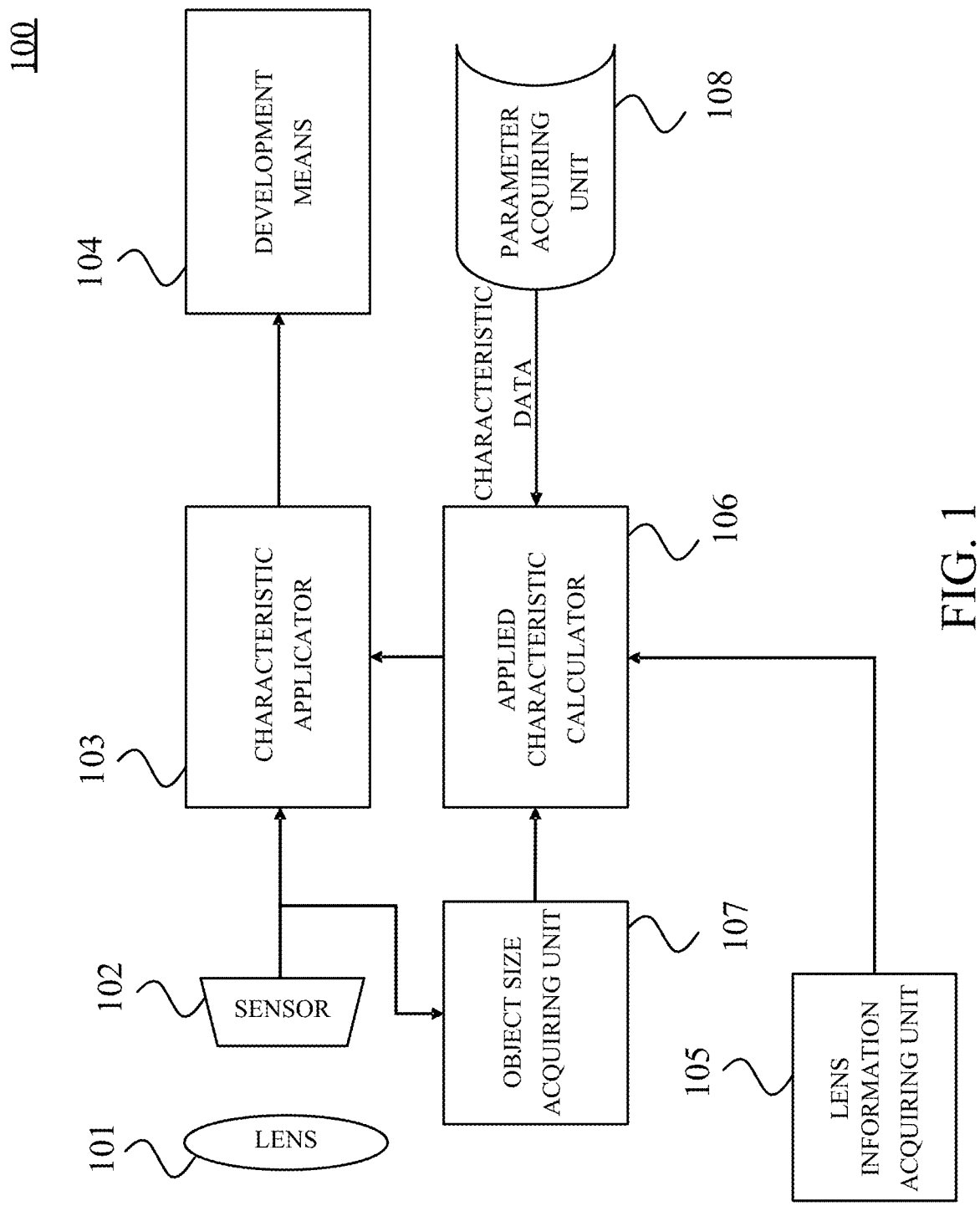
FIG. 1 is a block diagram of an image pickup apparatus according to a first embodiment.

First, an image pickup apparatus (image processing apparatus) 100 according to a first embodiment will be described below with reference to FIG. 1. FIG. 1 is a block diagram of the image pickup apparatus 100. A lens 101 is an optical system (image pickup optical system) that forms an optical image of an object. A sensor 102 is an image sensor such as a CMOS sensor and photoelectrically converts an optical image formed through the lens 101 and outputs raw image data. In this embodiment, a lens apparatus including the lens 101 is detachably attached to a camera body including the sensor 102, but this embodiment is not limited to this example and the camera body and the lens apparatus may be integrated.

A characteristic applicator (generator) 103 applies a lens characteristic to be described below to raw image data (first image data) through image processing, thereby generating raw image data (second image data) to which a desired lens characteristic is applied. In this manner, the characteristic applicator 103 performs image processing on raw image data by using characteristic data corresponding to a characteristic (for example, aberration characteristic) of the lens 101, thereby generating raw image data to which a lens characteristic is applied. An image development unit 104 develops such raw image data to which a lens characteristic is applied, and outputs video data. The video data is used for video recording and video outputting.

A lens information acquiring unit 105 acquires lens information (at least one of the states of zoom, focus, and aperture stop) such as focal length (zoom information), focus position information, and aperture (F-number or aperture value) information when the lens 101 forms an optical image. The lens information acquired by the lens information acquiring unit 105 is output to a characteristic calculator (third acquiring unit) 106. An object size acquiring unit (first acquiring unit) 107 acquires a raw image from the sensor 102, detects an object (object area) in the image, and acquires an object size (size of the object area). The object size is not limited to information indicating the object size itself but only needs to be information (information about the object size) from which the object size is directly or indirectly acquirable.

The object size acquired by the object size acquiring unit 107 is output to the characteristic calculator 106. The characteristic calculator 106 selects a desired lens characteristic (characteristic data) from a parameter acquiring unit (second acquiring unit) 108 configured to acquire characteristic data of the lens 101. Then, the characteristic calculator 106 sets the selected lens characteristic to the characteristic applicator 103. Accordingly, video data to which the desired lens characteristic is applied can be obtained.

Figure 2:
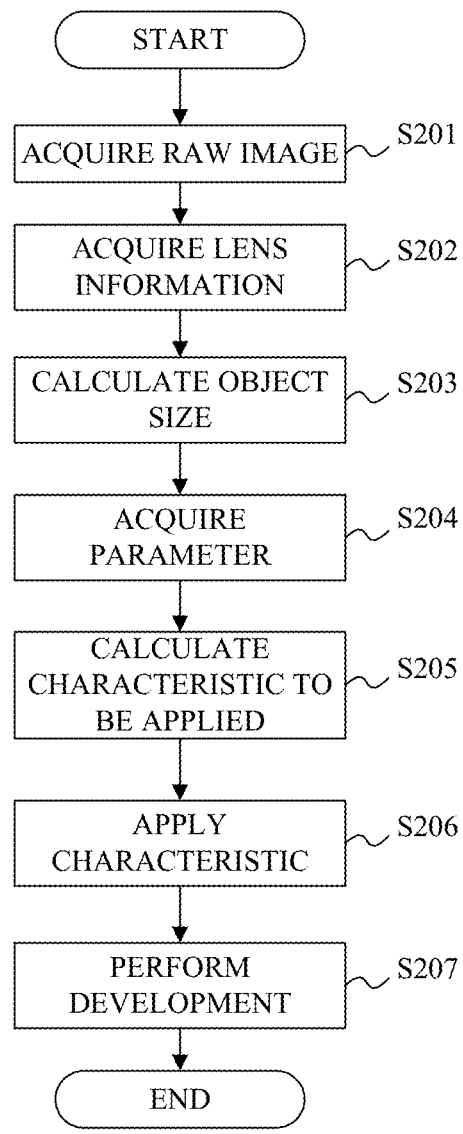
FIG. 2 is a flowchart illustrating processing by the image pickup apparatus according to the first embodiment.

Processing (image processing method) by the image pickup apparatus 100 in this embodiment will be described below with reference to FIG. 2. FIG. 2 is a flowchart illustrating the processing by the image pickup apparatus 100.

First at step S201, the image pickup apparatus 100 acquires a raw image (first image data) obtained by the sensor 102 through imaging. Next, at step S202, the lens information acquiring unit 105 acquires lens information such as focal length information (zoom information), focus position information, and aperture information after the imaging is performed at step S201. Next, at step S203, the object size acquiring unit 107 detects an object (object area) based on the raw image data acquired at step S201 and calculates (acquires) an object size (size of the object in the image).

Next, at step S204, the characteristic calculator 106 acquires, from the parameter acquiring unit 108, characteristic data (parameter) in accordance with the lens information acquired at step S202, such as the focal length information (zoom information), the focus position information, and the aperture information. The parameter is a parameter for reproducing the aberration characteristic of the lens 101 by signal processing. Next, at step S205, the characteristic calculator 106 calculates, based on the characteristic data acquired at step S204, a characteristic (applied characteristic) to be applied to the raw image data in accordance with the object size calculated at step S203. Next, at step S206, the characteristic applicator 103 applies the characteristic calculated at step S205 to the raw image (first image data), thereby generating raw image data (second image data) to which the characteristic is applied. Finally, at step S207, the image development unit 104 develops the raw image data to which the characteristic is applied, thereby generating an image signal to be used for recording or outputting.

The applied characteristic calculation (step S205) in this embodiment will be described below in detail. The characteristic calculator 106 can acquire, from the parameter acquiring unit 108, a point spread function (PSF) characteristic indicating a lens characteristic desired to be applied for each of the number of object pixels, focal length (zoom information), focus position information, and aperture information. The actual lens characteristic has a complicate shape and changes with image positions. Thus, this embodiment will discuss, as a characteristic that can be relatively easily achievements, an applied PSF characteristic that has a circular shape uniform irrespective of screen position and has a characteristic value in each image height direction from the center.

The PSF characteristic is expressed as P(n, r) by using a number n of object pixels and an image height r from the characteristic center (distance from the center). The number n of object pixels is calculated based on the object size calculated at step S203. In a case where the number n of object pixels acquired as described above is between a number $n_1$ of pixels and a number $n_2$ of pixels ($n_1 < n < n_2$) for which the PSF characteristic is stored in the parameter acquiring unit 108, the PSF characteristic with the number n of object pixels is expressed by expression (1) below through linear approximation:

$$P(n, r) = \frac{(n_2 - n) \times P(n_1, r) + (n - n_1) \times P(n_2, r)}{(n_2 - n_1)} \quad (1)$$

Since the PSF characteristics $P(n_1, r)$ and $P(n_2, r)$ and the numbers $n_1$ and $n_2$ of pixels are known values stored in the parameter acquiring unit 108, a PSF characteristic value for the number n of object pixels can be acquired.

For example, in a case where it is determined that at least one of focal length information (zoom information), focus position information, and aperture information has not changed since the last PSF characteristic is calculated, the change amount (difference) from the last PSF characteristic to a currently calculated PSF characteristic is calculated based on the last PSF characteristic. Then, in a case where the change amount (difference between the last characteristic and the current characteristic) is equal to or larger than a predetermined threshold, a PSF characteristic with a restricted change amount is calculated and a result of the calculation is set as a current PSF characteristic. The predetermined threshold may be, for example, the amount of maximum lens characteristic change of a reproduction target lens or the amount of maximum change of at least one information such as aperture information but is not limited thereto. Moreover, the change amount may be controlled, for example, by setting zero to the change amount and continuously using the last PSF characteristic or by simply decreasing the change amount, and thus the control method is not particularly limited. Accordingly, a lens characteristic basically changes in accordance with change of focal length information (zoom information), focus position information, and aperture information. Thus, discomfort caused by controlling lens characteristic change due to any other factor is less noticeable by a user.

After the calculation of a PSF characteristic to be applied, the characteristic to be applied needs to be set to the characteristic applicator 103. For example, processing of convolution calculation is assumed as a method of applying the characteristic by the characteristic applicator 103. In this embodiment, description will be made on a case where the number of taps with which the characteristic applicator 103 performs the convolution calculation is 11. In the convolution calculation in this case, an 11×11 matrix M(x, y) centered at a focus pixel is provided as setting and subjected to the convolution calculation with pixel data. Each coefficient of the matrix M(x, y) is expressed by expression (2) below, where the image height r is the distance from the center pixel (x, y)=(5, 5):

$$M(x, y) = P\left(n, \sqrt{(x-5)^2 + (y-5)^2}\right) \quad (2)$$

As described above, matrix setting of a characteristic to be applied can be determined, and a desired characteristic can be applied to image data through calculation by the characteristic applicator 103 with the setting. The above-described calculation formula is an exemplary method of applied characteristic calculation and any other calculation formula may be used. However, under a condition with the same focal length information, focus position information, and aperture information, an applied characteristic may be calculated so that blur is smaller when the object size is a first size than when the object size is a second size larger than the first size.

The characteristic calculator 106 uses change of the object size for PSF characteristic calculation and restricts the change amount from the last calculated PSF characteristic in a case where at least one of focal length information (zoom information), focus position information, and aperture information has not changed since the last calculation. In other words, the characteristic calculator 106 restricts the amount of characteristic change due to change of the object size in a case where it is determined that the at least one state has not changed. In a case where it is determined that the at least one state has not changed, the characteristic calculator 106 may restrict the amount of characteristic change due to change of the object size in an imaging state and not restrict the amount of characteristic change in a non-imaging state. The characteristic calculator 106 may decreases the change amount in a case where it is determined that the amount of characteristic change due to change of the object size is larger than a predetermined threshold. The predetermined threshold may be the maximum change amount of an optical characteristic of the lens 101. The characteristic calculator 106 may set zero to the amount of characteristic change in a case where it is determined that the at least one state has not changed.

This embodiment can reduce discomfort of video change without degrading skin fineness.

Second Embodiment

A second embodiment will be described below. The configuration of an image pickup apparatus according to this embodiment is the same as that of the image pickup apparatus 100 described above in the first embodiment with reference to FIG. 1, and thus a description thereof will be omitted.

Figure 3:
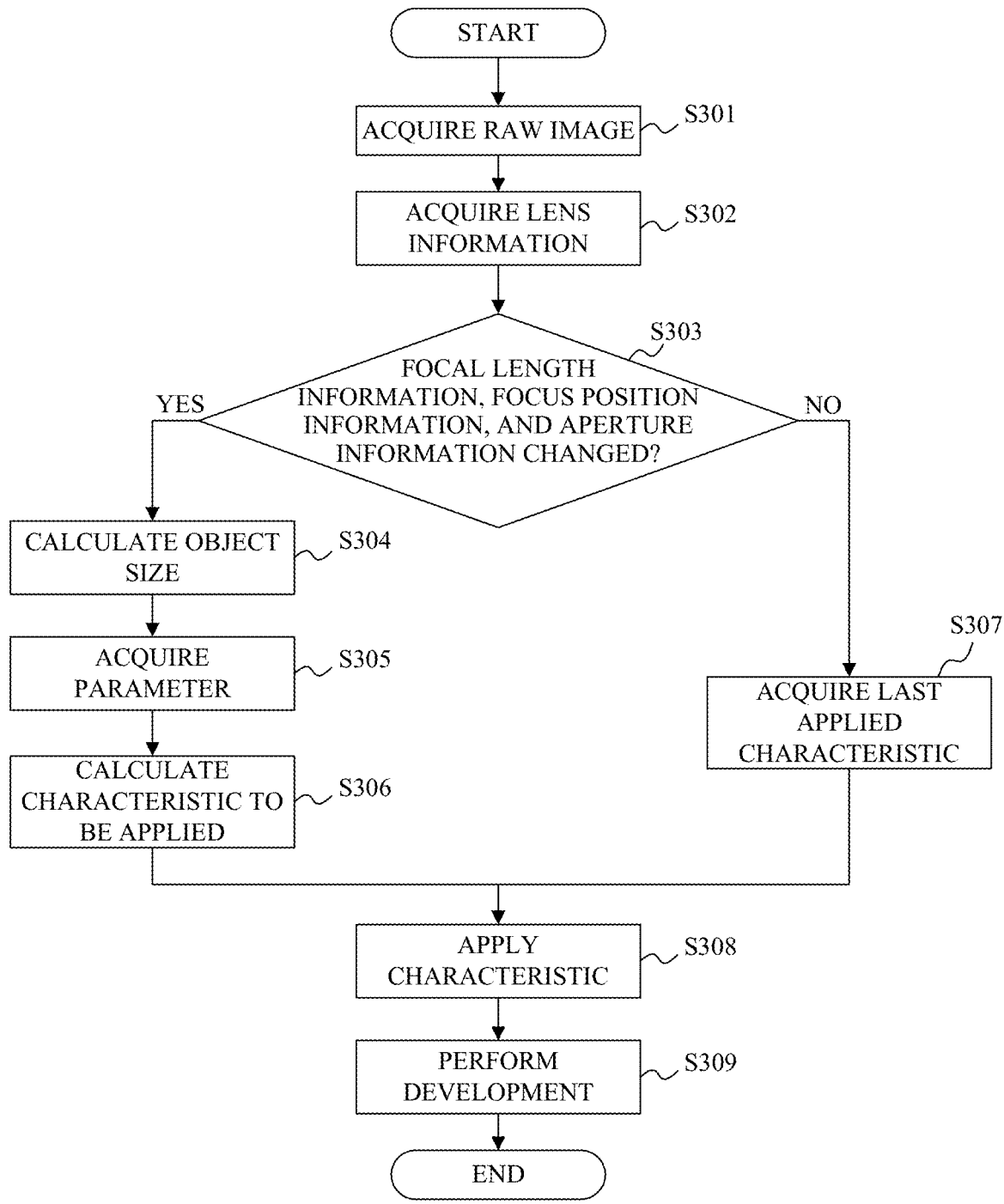
FIG. 3 is a flowchart illustrating processing by an image pickup apparatus according to a second embodiment.

The processing (image processing method) by the image pickup apparatus 100 according to this embodiment will be described below with reference to FIG. 3. FIG. 3 is a flowchart illustrating the processing by the image pickup apparatus 100.

First at step S301, the image pickup apparatus 100 acquires raw image (first image data) obtained by the sensor 102 through image pickup. Next, at step S302, the lens information acquiring unit 105 acquires lens information such as focal length information (zoom information), focus position information, and aperture information when the image pickup is performed at step S301.

Next, at step S303, the characteristic calculator 106 determines whether the focal length information (zoom information), focus position information, and aperture information acquired at step S302 has changed from its last information. In a case where it is determined that the information has changed, the process proceeds to step S304. In a case where it is determined that the information has not changed, the process proceeds to step S307. In this embodiment, whether all the focal length information (zoom information), the focus position information, and the aperture information has changed is the determination criterion as an example, but this embodiment is not limited to this example. Whether at least one of the three pieces of information has changed may be the determination criterion, and combination of pieces of information used as the determination criterion among the three pieces of information is not limited.

At step S304, the object size acquiring unit 107 detects an object (object area) based on the raw image data acquired at step S301 and calculates (acquires) an object size (size of the object in the image). Next, at step S305, the characteristic calculator 106 acquires, from the parameter acquiring unit 108, characteristic data (parameter) in accordance with the lens information acquired at step S302, such as the focal length information (zoom information), the focus position information, and the aperture information. Next, at step S306, the characteristic calculator 106 calculates, based on the characteristic data acquired at step S305, a characteristic (applied characteristic) to be applied to the raw image data in accordance with the object size calculated at step S304. At step S307, the characteristic calculator 106 acquires a characteristic (applied characteristic) last applied by the characteristic applicator 103.

At step S308, the characteristic applicator 103 applies the characteristic calculated at step S306 or the characteristic (last characteristic) acquired at step S307 to the raw image, thereby generating raw image data (second image data) to which the characteristic is applied. In this case, the applied characteristic is stored in an unillustrated memory or the like. Finally, at step S309, the image development unit 104 develops the raw image data to which the characteristic is applied, thereby generating an image signal to be used for recording or outputting. The method of applied characteristic calculation (step S306) is the same as the calculation method described above in the first embodiment, and thus a description thereof will be omitted.

Timings of applied characteristic calculation will be described below with reference to FIGS. 4A and 4B. FIGS. 4A and 4B illustrate the timings of applied characteristic calculation. FIG. 4A illustrates the relationship of temporal changes of focus (focus position information), aperture (aperture information), zoom (zoom information), and the object size with calculation timings. FIG. 4B illustrates information for applied characteristic calculation at each of calculation timings A, B, and C in FIG. 4A, in other words, a focus state ("far" or "near"), an aperture state ("closed" or "open"), a zoom state ("near" or "far"), and an object size state ("small" or "large").

At the calculation timing "A", the information used for applied characteristic calculation is focus "far," aperture stop "open," and zoom "near." At the next calculation timing "x," the information has not changed from that at the last calculation (calculation timing A). Thus, at the calculation timing "x," the object size acquiring unit 107 does not calculate an object size and the characteristic calculator 106 does not calculate a characteristic.

In this embodiment, the characteristic calculator 106 uses a change of the object size for PSF characteristic calculation and changes processing in accordance with whether the focal length information (zoom information), the focus position information, and the aperture information have changed from those at the last calculation. More specifically, the characteristic calculator 106 does not calculate an applied characteristic and the object size acquiring unit 107 does not calculate an object size in a case where the focal length information (zoom information), the focus position information, and the aperture information have not changed from those at the last calculation. Thus, it is possible to reduce a processing load and also reduce discomfort of video change without degrading skin fineness.

In each embodiment, a characteristic applied to an image is affected by both a mounted lens (lens apparatus) and the applied characteristic. To reduce influence of the mounted lens, a characteristic corrected in accordance with a characteristic of the mounted lens may be stored as a characteristic acquired from the parameter acquiring unit 108.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

The present disclosure can provide an image processing apparatus capable of acquiring an image to which a desired effect is applied without providing discomfort to a user.

This application claims the benefit of Japanese Patent Application No. 2023-022028, which was filed on Feb. 15, 2023, and which is hereby incorporated by reference herein in its entirety.

What is claimed is:

1. An image processing apparatus comprising:
a memory storing instructions; and
a processor configured to execute the instructions to:
acquire information about an object size in first image data,
acquire a parameter about an optical characteristic of an optical system,
acquire, based on the parameter, a characteristic that changes according to the information about the object size, and
generate second image data by applying the characteristic to the first image data,
wherein the parameter changes according to at least one of states of zoom, focus, and an aperture stop of the optical system, and
wherein the processor is configured to change processing according to whether it is determined that the at least one state has changed.

2. The image processing apparatus according to claim 1, wherein in a case where it is determined that the at least one state has not changed, the processor is configured to restrict a change amount of the characteristic due to a change of the information about the object size.

3. The image processing apparatus according to claim 2, wherein in a case where it is determined that the at least one state has not changed,
the processor is configured to restrict the change amount of the characteristic due to the change of the information about the object size in an imaging state, and
the processor is configured not to restrict the change amount of the characteristic in a non-imaging state.

4. The image processing apparatus according to claim 2, wherein in a case where it is determined that the change amount of the characteristic due to the change of the information about the object size is larger than a predetermined threshold, the processor is configured to decrease the change amount.

5. The image processing apparatus according to claim 4, wherein the predetermined threshold is a maximum change amount of the optical characteristic of the optical system.

6. The image processing apparatus according to claim 2, wherein in a case where it is determined that the at least one state has not changed, the processor is configured to set the change amount of the characteristic to zero.

7. The image processing apparatus according to claim 1, wherein in a case where it is determined that the at least one state has not changed, the processor is configured to:
acquire a last characteristic that has already been calculated without newly calculating the characteristic, and
generate second image data by applying the last characteristic to the first image data.

8. The image processing apparatus according to claim 7, wherein in a case where it is determined that the at least one state has not changed, the processor is configured not to change the characteristic even if the information about the object size changes.

9. The image processing apparatus according to claim 7, wherein in a case where it is determined that the at least one state has not changed, the processor is configured to:
acquire the last characteristic without newly calculating the characteristic in an imaging state, and
newly calculate the characteristic without acquiring the last characteristic in a non-imaging state.

10. The image processing apparatus according to claim 1, wherein the processor is configured to calculate the characteristic based on the information about the object size and the at least one state of the optical system.

11. The image processing apparatus according to claim 1, wherein the processor is configured to acquire the information about the object size in a case where it is determined that the at least one state of the optical system has changed.

12. The image processing apparatus according to claim 1, wherein the parameter is a parameter for reproducing an aberration characteristic of the optical system by signal processing.

13. An image pickup apparatus comprising:
an image sensor configured to output first image data;
a memory storing instructions; and
a processor configured to execute the instructions to:
acquire information about an object size in the first image data,
acquire a parameter about an optical characteristic of an optical system,
acquire, based on the parameter, a characteristic that changes according to the information about the object size, and
generate second image data by applying the characteristic to the first image data,
wherein the parameter changes according to at least one of states of zoom, focus, and an aperture stop of the optical system, and
wherein the processor is configured to change processing according to whether it is determined that the at least one state has changed.

14. An image processing method comprising the steps of:
acquiring information about an object size in first image data;
acquiring a parameter about an optical characteristic of an optical system;
acquiring, based on the parameter, a characteristic that changes according to the information about the object size; and
generating second image data by applying the characteristic to the first image data,
wherein the parameter changes according to at least one of states of zoom, focus, and aperture of the optical system, and
wherein, the generating step changes processing according to whether it is determined that the at least one state has changed.

* * * * *